(12) United States Patent
Rauch et al.

(10) Patent No.: US 6,373,809 B1
(45) Date of Patent: Apr. 16, 2002

(54) MULTI-CHANNEL OPTICAL HEAD FOR OPTICAL RECORDING AND READING OPTICAL STORAGE DATA

(75) Inventors: Russell B. Rauch, Pasadena; Mark Shi Wang, Irvine, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/407,677

(22) Filed: Sep. 28, 1999

(51) Int. Cl.<sup>7</sup> ................................................ G11B 7/00
(52) U.S. Cl. .................... 369/121; 369/112.28
(58) Field of Search ................ 369/112.01, 112.05, 369/112.22, 44.37, 44.23, 121, 112.28

(56) References Cited

U.S. PATENT DOCUMENTS 4,466,087 A    8/1984    Cheng ........................ 369/45

5,986,998 A  * 11/1999  Park .......................... 369/121

* cited by examiner

*Primary Examiner*—Nabil Hindi
(74) *Attorney, Agent, or Firm*—William Propp

(57) ABSTRACT

The multi-channel optical head for recording and reading optical storage data has a write laser array for generating a plurality of write beams and a read laser array for generating a plurality of read beams. The write beams and the read beams share a common optical path with a first broadband non-polarizing beam splitter which directs the beams towards the optical recording medium or to a power detector and with a second broadband non-polarizing beam splitter which directs the write beams and the read beams to the optical recording medium and which directs the read beams, after retroreflection and information modulation from the optical recording medium, to be split by a beam splitter and focused onto a detector to provide focusing information and another detector which detects its intensity to read data and provides tracking information.

7 Claims, 1 Drawing Sheet

MULTI-CHANNEL OPTICAL HEAD FOR OPTICAL RECORDING AND READING OPTICAL STORAGE DATA

BACKGROUND OF THE INVENTION

The present invention relates to an optical head for recording and reading optical storage data and, more particularly, to a multiple channel optical head with separate write and read beams sharing a partially common optical path.

Optical storage media such as digital optical disks or digital tapes are alternatives to magnetic tape and disk memories. Optical storage offers a substantially greater data storage capacity than commercially available magnetic tape or disk memories of similar size. Optical storage media can be fixed in position within the optical writing and reading system or can be removable from the system.

A high data transfer rate is desirable in optical writing and reading systems, in addition to a large capacity for storage of data. The adoption of a multi-beam optical head has been proposed in which a plurality of writing and reading converging light beam spots are used in the optical head to obtain the high data transfer rate.

An optical head is used to write and read data on an optical recording and storage medium, which can be physically rotated or moved to allow access of various parts of the recording and storage medium to beams from the optical head.

With optical disk systems, an optical head can have separate lasers with separate optical paths for writing, reading, and tracking of the read/write laser spots on the optical recording and storage medium disk. The major advantages of such a system are good performance and versatility, while the major disadvantages are complicated optics, critical alignment, bulk and expense.

Alternately, the write laser and the read laser can be closely spaced in the optical head and share a common optical path to the optical recording medium. This provides the advantages of a compact system in size and easier alignment due to shorter optical paths.

The third choice is for the optical head to have partially common and partially separate optical paths for the write laser and the read laser to the optical recording medium. Typically the read and write lasers will share the optical path at least from the focusing object lens to the optical recording medium. In addition to a compact system in size and easier alignment, the partially shared optical path system is simpler in design and has a lower manufacturing cost.

It is an object of this invention to provide a multi-channel optical head for recording and reading optical storage data with separate write and read beams sharing a partially common optical path.

SUMMARY OF THE INVENTION

According to the present invention, the multi-channel optical head for recording and reading optical storage data has a write laser array for generating a plurality of write beams and a read laser array for generating a plurality of read beams. The write beams are information modulated beams with a relatively higher intensity while the read beams are constant magnitude beams with a lower intensity. The write beams and the read beams will not be concurrently using the optical paths of the optical head.

The write beams and the read beams share a common optical path starting with a first broadband non-polarizing beam splitter which directs the beams in the common optical path towards the optical recording medium or to a power detector. The write and read beams will be circularly polarized by a quarter-wavelength plate, pass through a second broadband non-polarizing beam splitter and then focused by an object lens onto the optical recording medium.

The write beams will record data on the moving optical storage medium, such as an optical disk or optical tape. The read beams will read the data from the moving optical storage medium and retroreflect back through the object lens to be directed by the second broadband non-polarizing beam splitter along a separate optical path. The read beams will be split by a beam splitter and focused by a focusing lens onto a detector to provide focusing information and another detector which detects its intensity to read data and provides tracking information.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
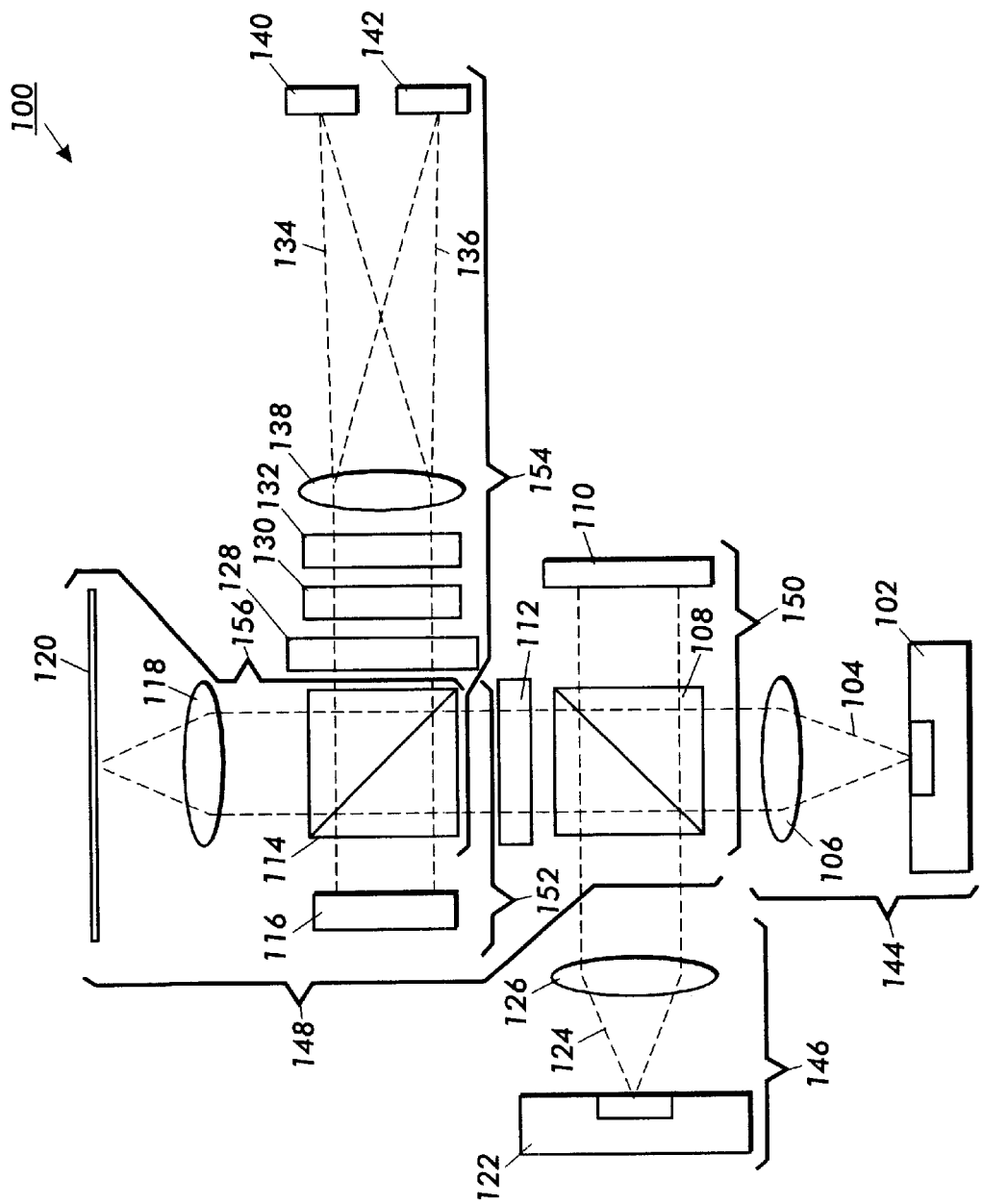
FIG. 1 shows a multiple channel optical head for recording and reading optical storage data of the present invention.

Reference is now made to FIG. 1, wherein there is illustrated a multiple channel optical head 100 for recording and reading optical storage data as an embodiment of the present invention.

A write laser 102 array in the multiple channel optical head 100 has a plurality of independently addressable coherent light emitting elements to generate a plurality of laser beams 104. The write laser array 102 can either be a linear array or an area array. The emitted laser beams 104 have a cross-section defined by the active, light emitting region of the laser which can be shaped by an aperture. The emitted light beams 104 are linearly polarized and all have a common first wavelength. Each light emitting element is independently modulated to provide an information modulated write beam.

The linearly polarized write beams 104 are collimated by a first collimating lens 106. The collimated linearly polarized write beams 104 then pass through a first broadband, non-polarizing, beam-splitter 108.

A portion of the write beams are split by the first beam-splitter 108 and directed to a power detector 110. Another portion of the write beams are split by the first beam-splitter 108 and directed to a first quarter-wavelength plate 112.

The linearly polarized write beams 104 are circularly polarized by the first quarter-wavelength plate 112.

The collimated circularly polarized write beams 104 then pass through a second broadband, non-polarizing, beam-splitter 114.

A portion of the write beams are split by the second beam-splitter 114 and directed to an absorber 116 to block the return of the light beams form this path. Another portion of the write beams are split by the second beam-splitter 114 and directed to a first object lens 118.

The write beams 104 are focused by the first object lens 118 into a plurality of write beam spots onto the optical recording medium 120.

The optical recording medium 120 is a light level sensitive recording material which, typically, is a movable tape (by means not shown) during operation at an essentially constant velocity or a rotatable disk (by means not shown) during operation at an essentially constant angular velocity. For example, optical recording medium 120 can comprise an ablatable tellerium-based reflective film which is coated on an optically transparent substrate, such as glass or plastic or can comprise a phase change film (which varies in reflectivity).

The pulse output power of the write laser 102 is controlled by independent modulation of current applied to each light emitting element of the write laser array. The intensity of each write beam 104, as measured at the surface of the optical recording medium 120, shifts above and below a predetermined ablation threshold level for the optical recording medium as a function of the modulation.

Consequently, each write beam opens small holes in the optical recording medium along a data track position, or otherwise changes the physical nature of portions of the optical recording medium along a data track position, for example, by modifying its absorption, reflectivity or polarization properties, with such holes or changes representing the binary data which is to be recorded. The data track can be a portion of a continuous spiral or one of a plurality of concentric data tracks on a disk or parallel tracks on a tape.

The multi-channel beams 104 from the write laser 102 are used to record data on the optical medium 120.

The write beams 104 can also record fiducal lines or marks on the optical medium 120 to later enable accurate location of blocks of storage information. These fiducal lines or marks will ensure proper registration for the read beams for data that has been written by the write beams.

The first broadband, non-polarizing, beam-splitter 108 will also partially reflect the write beams 104 to the detector 110 for power detection. The intensity of the write beams 104 is required to shift above and below a predetermined ablation (or reflectivity) threshold level for the optical recording medium 120. The detector 110 detects the power intensity of the write beams 104 and converts it to an electrical signal in the manner of a normal silicon photo-diode or other type photo-detection device. The output of the photo-detector 110 would be coupled to an amplifier (not shown) to amplify the signal to pass to the write laser 102 power control circuit (not shown).

Also in the optical head 100, a read laser 122 array has a plurality of coherent light emitting elements to generate a plurality of laser beams 124. The read laser array 122 can either be a linear array or an area array. The emitted laser beams 124 have a cross-section defined by the active, light emitting region of the laser which can be shaped by an aperture. The emitted light beams 124 are linearly polarized and all have a common second wavelength, different from the first wavelength of the write beams 104. Each light emitting element is continuous emission at a substantially constant magnitude to provide an unmodulated read beam.

The linearly polarized read beams 124 are collimated by a second collimating lens 126. The collimated linearly polarized read beams 124 then pass through the first broadband, non-polarizing, beam-splitter 108.

A portion of the read beams are transmitted by the first beam-splitter 108 and directed to a power detector 110. Another portion of the read beams are split by the first beam-splitter 108 and directed to the first quarter-wavelength plate 112.

The linearly polarized read beams 124 are circularly polarized by the first quarter-wavelength plate 112. The first quarter-wavelength plate 112 is sensitive to a range of wavelengths including the first wavelength of the write beams and the second wavelength of the read beams. The first quarter-wavelength plate will polarize light beams at both the first and second wavelengths.

A portion of the collimated circularly polarized read beams 124 pass through the second broadband, non-polarizing, beam-splitter 114.

A portion of the read beams are split by the second beam-splitter 114 and directed to the absorber 116 to block the return of the light beams form this path. Another portion of the read beams are split by the second beam-splitter 114 and directed to the first object lens 118.

The read beams 124 are focused by the first object lens 118 into a plurality of read beam spots onto the optical recording medium 120.

The read beams 124 are reflected from the optical recording medium 120 and are modulated by the previously written and recorded data on the optical recording medium 120. The intensity of read beams 124 is below the threshold recording level of the optical recording medium 120.

The first broadband, non-polarizing, beam-splitter 108 will also partially transmit the read beams 124 to the detector 110 for power detection. The intensity of the read beams 124 is required to be at a substantially constant magnitude and below the threshold recording level of the optical recording medium 120. The detector 110 detects the power intensity of the read beams 124 and converts it to an electrical signal in the manner of a normal silicon photo-diode or other type photo-detection device. The output of the photo-detector 110 would be coupled to an amplifier (not shown) to amplify the signal to pass to the read laser 122 power control circuit (not shown).

The continuous unmodulated read beams 124 do not effect the optical properties of the optical recording medium 120 but are reflected after being intensity modulated in accordance with any recorded data the beam scans.

The reflected modulated read beams 124 are retroreflected back though the first object lens 118 to the second broadband, non-polarizing, beam-splitter 114.

A portion of the reflected modulated read beams are split by the second beam-splitter 114 and directed to the first quarter-wavelength plate 112.

Another portion of the reflected modulated read beams are split by the second beam-splitter 114 and directed to a second quarter-wavelength plate 128.

The circularly polarized modulated read beams 124 are linearly polarized by the second quarter-wavelength plate 128. The linearly polarized modulated read beams 124 are filtered by wavelength bandpass filter 130. The filter 130 transmits the read beams 124 of the second wavelength while blocking any write beams 104 of the first, and different, wavelength which may have been retroreflected from the optical recording medium 120 during writing mode.

The modulated read beams 124 are then split by a binary beam splitter 132 into two beams 134 and 136 of equal intensity. The second quarter-wavelength plate 128 has previously rendered the circularly polarized read beams linearly polarized again so that the beam splitter 132 will be more efficient.

The two modulated read beams 134 and 136 are each focused by the second object lens 138.

The first modulated read beam 134 is focused by the second object lens 138 onto a first detector 140 for autofocus detection. The first detector can be an astigmatic detector or a split detector.

The first detector 140 detects the information modulated light and converts it to an electrical signal that varies with the focus. The output of the photo-detector 140 would be coupled to an amplifier (not shown) to amplify the signal to control a servo actuator (not shown) to adjust the position of the first object lens 118 which focuses the read beams on the optical medium 120.

The multi-channel optical head 100 is movable along the line in the radial direction of the optical recording medium 120 by a driving means (not shown) if the medium is a disk or moveable along a line in the transverse direction of the optical recording medium 120 by a driving means (not shown) if the medium is a tape. In response to the autofocus detection signal, the objective lens 118 can be moved back and forth relative to recording material 120 by a servo controlled voice coil (not shown) so that the read beams 124 are sharply focused at the recording medium 120.

The second modulated read beam 136 is focused by the second object lens 138 onto a second detector 142 for data reading and trackline tracking. In the data reading mode, the detector 142 detects the information modulated read beams 124 and converts it to an electrical signal in the manner of a normal silicon photo-diode or other type photo-detection device. The output of the photo-detector 142 would be coupled to an amplifier (not shown) to amplify the signal to pass to the output as digital data.

Simultaneously with the data reading mode, in the trackline tracking mode, the second detector 142 detects the information modulated read beams 124 that varies with tracking error and converts it to an tracking error signal. The error signal is connected to a differential amplifier (not shown) to amplify the signal to control a servo actuator (not shown) to adjust the position of the first object lens 118 which tracks the read beams on the optical medium 120.

A portion of the reflected modulated read beams are split by the second beam-splitter 114 and directed to the first quarter-wavelength plate 112. The first quarter-wavelength plate 112 prevents partially reflected read beams 124 and/or write beams 104 from the optical recording medium 120, which pass through the second broadband, non-polarizing, beam-splitter 114, from returning to the write laser 102 and the read laser 122 and thus causing instability via optical feedback signals to these lasers. The first quarter-wavelength plate 112 rotates in an orthogonal direction the polarization of these partially reflected read beams 124 and/or write beams 104 so that the partially reflected beams are out of phase with the emitted beams from the laser arrays. Feedback is prevented since the polarization of the beams are rotated 90 degrees from the initial polarization.

The multi-channel beams 124 from the read laser 122 illuminate previously written data on the optical recording medium 120 for reading, illuminate previously written tracks on the optical recording medium 120 for tracking and supply a spot for focusing.

The write laser 102 and the first collimator lens 106 form the first write optical path 144 for the write laser beams 104.

The read laser 122 and the second collimator lens 126 form the first read optical path 146 for the read laser beams 124.

The first broadband, non-polarizing, beam-splitter 108, the first quarter-wavelength plate 112, the second broadband, non-polarizing, beam-splitter 114, the first object lens 118 and the optical recording medium 120 form the first common optical path 148 for the write laser beams 104 and the read laser beams 124.

The first broadband, non-polarizing, beam-splitter 108 and the power detector 110 form the second common optical path 150 for the write laser beams 104 and the read laser beams 124.

The second broadband, non-polarizing, beam-splitter 114 and the optical stop 116 form the third common optical path 152 for the write laser beams 104 and the read laser beams 124.

The second broadband, non-polarizing, beam-splitter 114, the second quarter-wavelength plate 128, the wavelength bandpass filter 130, the beam splitter 132, the second object lens 138, the first autofocus detector 140 and the second read/track detector 142 form the second read optical path 154 for the read laser beams 124.

By means of a retroreflecting light and optical system, the same optical path 156 between the second broadband, non-polarizing, beam-splitter 114, the first object lens 118 and the optical recording medium 120 can be used not only for recording, but for read back of the recorded data on the recording media. A non-polarizing beam splitter 114 is utilized to cause the light beam to pass through an optical system whereby both focus error and tracking error as well as the data signal can be generated.

The write beams 104 and the read beams 124 will not be concurrently using the optical paths of the optical head 100. The optical head at any given moment will either be in a write mode or a read mode or neither. The optical head will never be in both a write mode and a read mode with both laser arrays 102 and 122 using the common optical paths at the same time.

While the invention has been described with reference to the structures disclosed, it is not confined to the details set forth, but is intended to cover such modifications or changes as they come within the scope of the following claims.

What is claimed is:

1. An optical head for recording and reading data on an optical recording medium comprising:
  a first light source for generating a plurality of data modulated write beams, said write beams being at a higher power level to record said data on said optical recording medium,
  a second light source for generating a plurality of read beams, said read beams being at a lower power level to read said data on said optical recording medium,
  a first broadband non-polarizing beam splitter for directing said write beams or said read beams to a first detector for power detection or to said optical recording medium,
  a second broadband non-polarizing beam splitter for directing said write beams or said read beams to said optical recording medium and to direct said read beams retroreflected from said recording medium, and
  a beam splitter for splitting said retroreflected read beams from said second broadband non-polarizing beam splitter and directing said split beams to a second detector for focusing said read beams on said optical recording medium and a third detector for reading said data from said optical recording medium and for tracking said data from said optical recording medium.

2. The optical head for recording and reading data on an optical recording medium of claim 1 further comprising a first quarter-wavelength plate for circularly polarizing said write beams or said read beams from said first broadband non-polarizing beam splitter prior to said write beams or said read beams being incident on said second broadband non-polarizing beam splitter and for linearly polarizing and rotating the polarization of said retroreflected read beams from said second broadband non-polarizing beam splitter.

3. The optical head for recording and reading data on an optical recording medium of claim 2 further comprising a second quarter-wavelength plate for linearly polarizing said retroreflected read beams from said second broadband non-polarizing beam splitter prior to said read beams being split be said beam splitter.

4. The optical head for recording and reading data on an optical recording medium of claim 1 wherein said write beams having a first wavelength and said read beams having a second wavelength, different from said first wavelength, further comprising a wavelength bandpass filter between said second broadband non-polarizing beam splitter and said beam splitter, said wavelength bandpass filter transmitting said retroreflected read beams of said second wavelength and blocking said write beams of said first wavelength.

5. The optical head for recording and reading data on an optical recording medium of claim 1 further comprising a lens for focusing said write beams and said read beams from said second broadband non-polarizing beam splitter onto said optical recording medium and said retroreflected read beams from said optical recording medium onto said second broadband non-polarizing beam splitter.

6. The optical head for recording and reading data on an optical recording medium of claim 1 further comprising a lens for focusing said retroreflected read beams split by said beam splitter onto said second detector and said third detector.

7. An optical head for recording and reading data on an optical recording medium comprising:

- a first light source for generating a plurality of data modulated write beams, said write beams being at a higher power level to record said data on said optical recording medium,
- a first collimating lens for collimating said write beams,
- a second light source for generating a plurality of read beams, said read beams being at a lower power level to read said data on said optical recording medium,
- a second collimating lens for collimating said read beams,
- a first broadband non-polarizing beam splitter for directing said write beams or said read beams to a first detector for power detection or to said optical recording medium,
- a first quarter-wavelength plate for circularly polarizing said write beams or said read beams from said first broadband non-polarizing beam splitter,
- a second broadband non-polarizing beam splitter for directing said write beams or said read beams from said first quarter-wavelength plate to said optical recording medium and to direct said read beams retroreflected from said recording medium,
- a first lens for focusing said write beams or said read beams from said second broadband non-polarizing beam splitter onto said optical recording medium and said retroreflected read beams from said optical recording medium onto said second broadband non-polarizing beam splitter,
- a second quarter-wavelength plate for linearly polarizing said retroreflected read beams from said second broadband non-polarizing beam splitter, said first quarter-wavelength plate linearly polarizing and rotating the polarization of said retroreflected read beams from said second broadband non-polarizing beam splitter,
- a beam splitter for splitting said retroreflected read beams from said second broadband non-polarizing beam splitter through said second quarter-wavelength plate, and
- a second lens for focusing said retroreflected read beams split by said beam splitter onto a second detector for focusing said read beams on said optical recording medium and a third detector for reading said data from said optical recording medium and for tracking said data from said optical recording medium.

* * * * *